United States Patent
Leung et al.

(10) Patent No.: US 11,611,510 B2
(45) Date of Patent: Mar. 21, 2023

(54) NETWORK LATENCY FAIRNESS IN MULTI-USER GAMING PLATFORMS

(71) Applicant: QUALCOMM Incorporated, San Diego, CA (US)

(72) Inventors: Nikolai Konrad Leung, San Francisco, CA (US); Waqar Zia, Munich (DE); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/400,493

(22) Filed: Aug. 12, 2021

(65) Prior Publication Data

US 2022/0052954 A1 Feb. 17, 2022

Related U.S. Application Data

(60) Provisional application No. 63/066,144, filed on Aug. 14, 2020.

(51) Int. Cl.
*H04L 47/10* (2022.01)
*H04L 43/0852* (2022.01)

(52) U.S. Cl.
CPC .......... *H04L 47/15* (2013.01); *H04L 43/0858* (2013.01)

(58) Field of Classification Search
None
See application file for complete search history.

(56) References Cited

U.S. PATENT DOCUMENTS

| | | | |
|---|---|---|---|
| 7,680,038 B1* | 3/2010 | Gourlay | H04L 43/0852 370/468 |
| 9,308,455 B1* | 4/2016 | Kopikare | A63F 13/327 |
| 2003/0027639 A1 | 2/2003 | Peterson et al. | |
| 2003/0204565 A1* | 10/2003 | Guo | H04L 47/32 709/205 |
| 2006/0135258 A1 | 6/2006 | Maheshwari et al. | |
| 2020/0106819 A1* | 4/2020 | Morrison | A63F 13/358 |

(Continued)

FOREIGN PATENT DOCUMENTS

WO    WO-2007119236 A2 * 10/2007  ............. A63F 13/12

OTHER PUBLICATIONS

Aggarwal S., et al., "Fairness in Dead-Reckoning based Distributed Multi-Player Games", Network and System Support for Games, ACM, 2 Penn Plaza, Suite 701, New York, NY, 10121-0701, USA, Oct. 10, 2005 (Oct. 10, 2005), pp. 1-10, XP058193786, DOI: 10.1145/1103599.1103608, ISBN: 978-1-59593-156-6, the whole document.

(Continued)

*Primary Examiner* — Anh Vu H Ly
(74) *Attorney, Agent, or Firm* — Patterson & Sheridan, LLP

(57) ABSTRACT

Aspects of the present disclosure relate to wireless communications, and more particularly, to techniques that allow for enforcement of network latency fairness in multi-user gaming platforms. An example method generally includes identifying multiple user equipments (UEs) participating in a multi-user gaming platform across one or more wide area networks (WANs); and taking one or more actions to support latency fairness in delivery of information across the multiple users via the one or more WANs.

26 Claims, 14 Drawing Sheets

(56) References Cited

U.S. PATENT DOCUMENTS

2021/0118085 A1* 4/2021 Bushnell .................. H04L 9/50

OTHER PUBLICATIONS

International Search Report and Written Opinion—PCT/US2021/045890—ISA/EPO—dated Nov. 17, 2021.
Li Z., et al., "Lag Compensation for First-Person Shooter Games in Cloud Gaming", May 25, 2018 (May 25, 2018), ICIAP: International Conference on Image Analysis and Processing, 17th International Conference, Naples, Italy, Sep. 9-13, 2013, Proceedings, [Lecture Notes In Computer Science, Lect.Notes Computer], Springer, Berlin, Heidelberg, pp. 104-127, XP047473935, ISBN: 978-3-642-17318-9, [retrieved on May 25, 2018] the whole document.

\* cited by examiner

NETWORK LATENCY FAIRNESS IN MULTI-USER GAMING PLATFORMS

CROSS-REFERENCE TO RELATED APPLICATIONS

This application claims benefit to U.S. Provisional Patent Application Ser. No. 63/066,144, entitled "Network Latency Fairness in Multi-User Gaming Platforms," filed Aug. 14, 2020 and assigned to the assignee hereof, the contents of which are hereby incorporated by reference in its entirety.

TECHNICAL FIELD

Aspects of the present disclosure relate to wireless communications, and more particularly, to techniques that allow for network latency fairness in transmission, reception, and playback of content in multi-user gaming platforms.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for communication by a network entity. The method generally includes identifying multiple user equipments (UEs) participating in a multi-user gaming platform across one or more wide area networks (WANs), and taking one or more actions to support latency fairness in delivery of information across multiple users via the one or more WANs.

One innovative aspect of the subject matter described in this disclosure can be implemented in a method for wireless communication by a user equipment (UE). The method generally includes determining parameters of communications with a network entity, and taking one or more actions to support latency fairness with other UEs in delivery of information based on the determined parameters.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to techniques that allow for enforcement of network latency fairness in transmission, reception, and playback of content in multi-user gaming platforms. As will be described in greater detail below, network latency fairness may result in the transmission, reception, and playback of uplink and/or downlink data packets in such a manner that playback may be achieved at similar times for each of a plurality of devices (e.g., UEs) participating in a multi-user environment (e.g., a multi-user gaming environment) across one or more wide area networks (WANs).

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
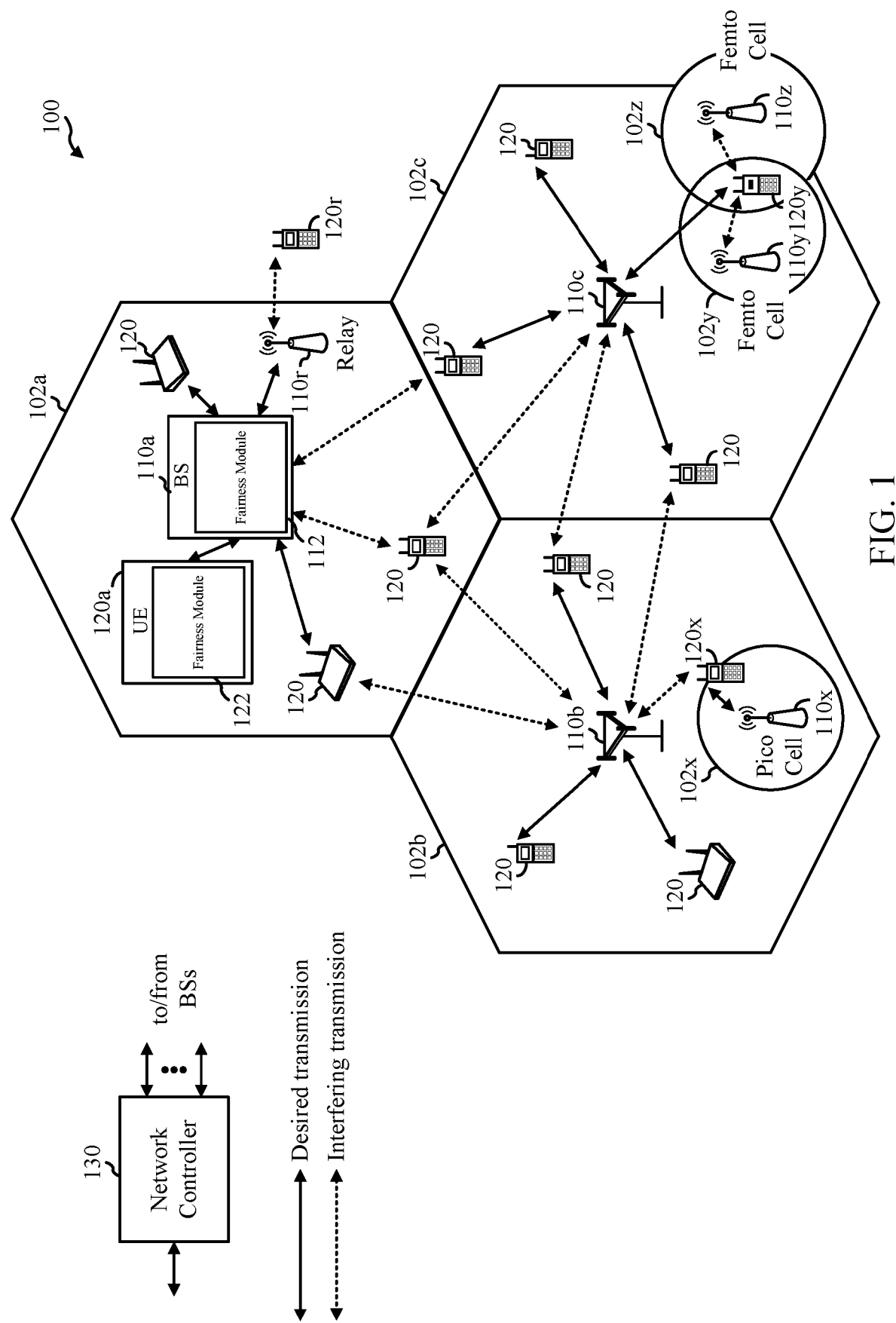
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include fairness module 122 that may be configured to perform (or cause UE 120a to perform) operations 500 of FIG. 5. Similarly, a BS 120a may include fairness module 112 that may be configured to perform (or cause BS 110a to perform) operations 400 of FIG. 4.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

The term "cell" may refer to a logical communication entity used for communication with a base station 110 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area or a portion of a geographic coverage area (e.g., a sector) over which the logical communication entity operates. Such cells may range from smaller areas (e.g., a structure, a subset of structure) to larger areas depending on various factors such as the capabilities of the base station 110. For example, a cell may be or include a building, a subset of a building, or exterior spaces between or overlapping with geographic coverage areas, among other examples.

Wireless communication network 100 may also include relay stations (for example, relay station 110*r*), also referred to as relays or the like, that receive a transmission of data or other information from an upstream station (for example, a BS 110*a* or a UE 120*r*) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
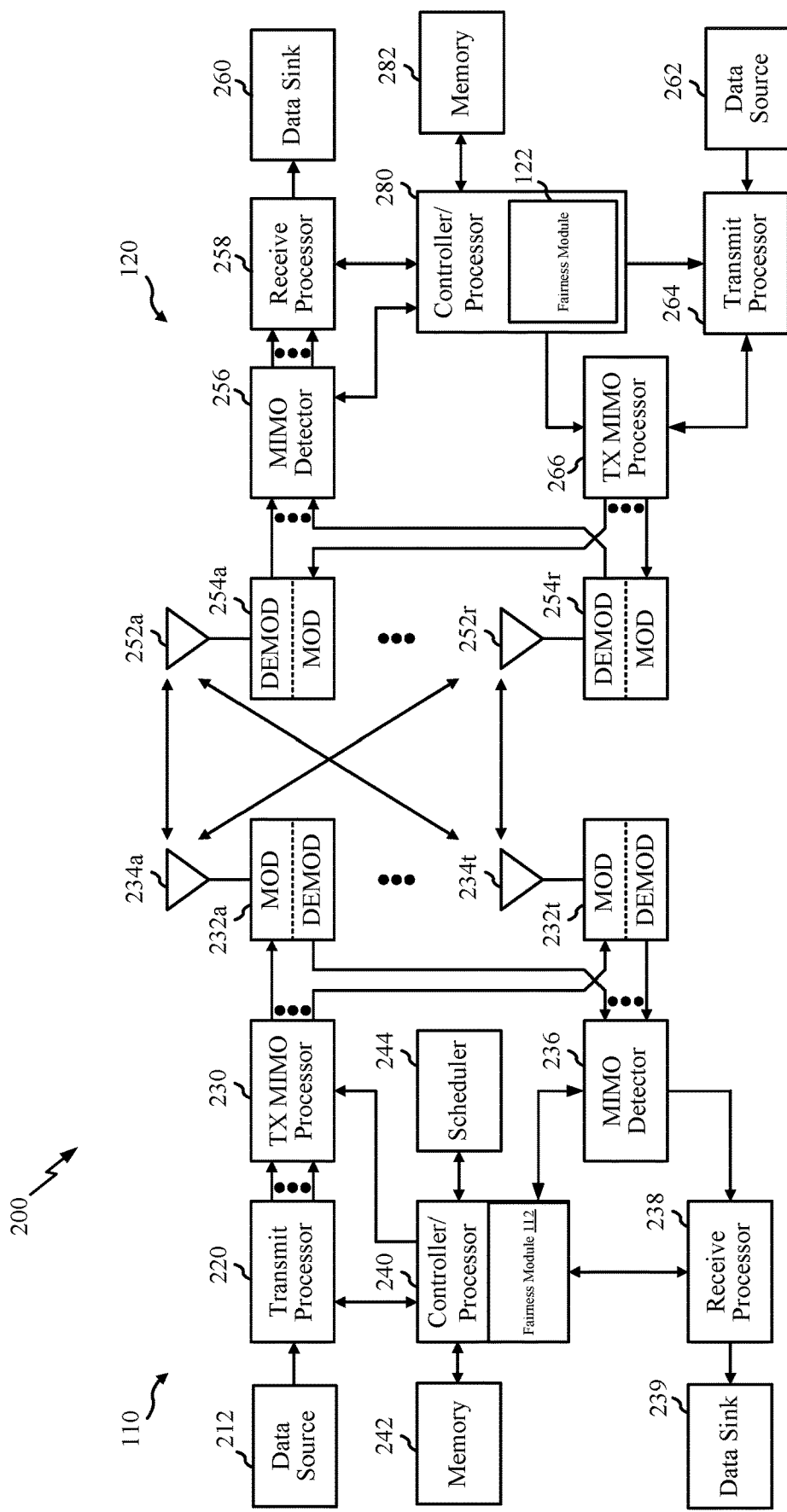
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232*a*-232*t*. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232*a*-232*t* may be transmitted via the antennas 234*a*-234*t*, respectively.

At the UE 120, the antennas 252*a*-252*r* may receive the downlink signals from the BS 110 and may provide received signals to the demodulators (DEMODs) in transceivers 254*a*-254*r*, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH)) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254*a*-254*r* (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has fairness module 122 that may be configured to perform (or cause UE 120 to perform) operations 500 of FIG. 5. Similarly, the BS 120*a* may include fairness module 112 that may be configured to perform (or cause BS 110*a* to perform) operations 400 of FIG. 4.

Figure 3A:
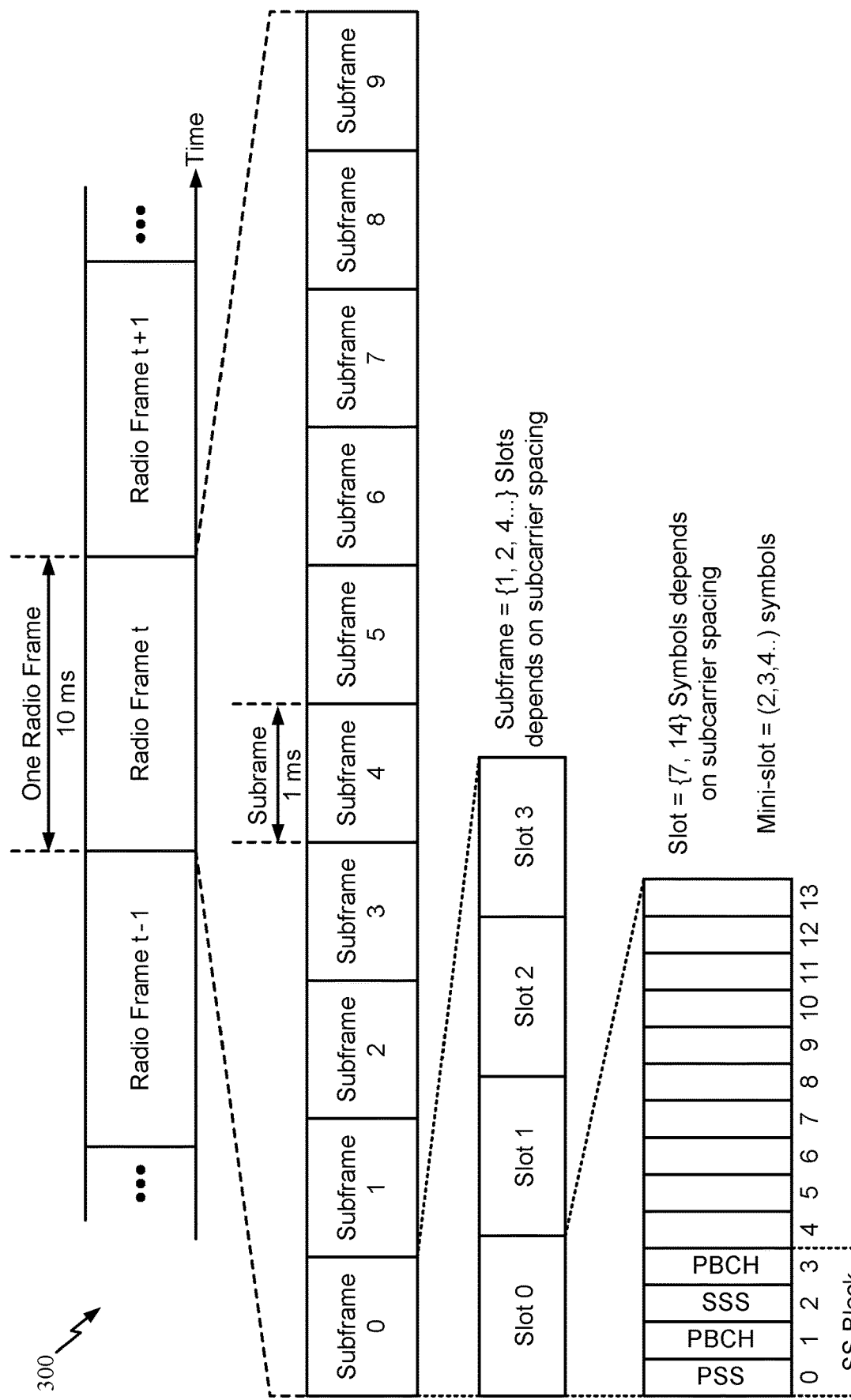
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
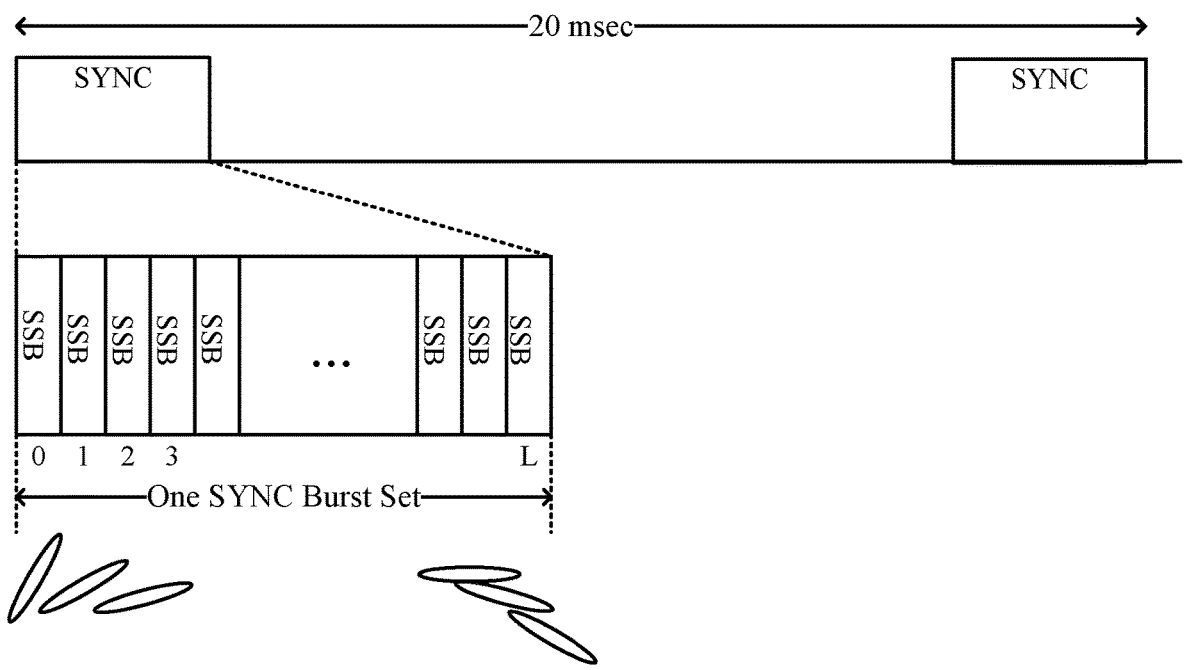
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Enforcing Network Latency Fairness in a Multi-User Gaming Platform Aspects of the present disclosure relate to wireless communications, and more particularly, to mobility techniques that allow for enforcement of network latency fairness in transmission, reception, and playback of content in multi-user gaming platforms. As will be described in greater detail below, network latency fairness may result in the transmission, reception, and playback of uplink and/or downlink data packets in such a manner that playback may be achieved at similar times for each of a plurality of devices (e.g., UEs) participating in a multi-user environment (e.g., a multi-user gaming environment) across one or more wide area networks (WANs).

Gaming systems may support competitive gameplay by multiple users on any number of devices. In many environments, competitive gameplay may occur in a single location in which the same hardware and software platform is provided to each participant and in which each user device is connected in a local area network (LAN) that may be overprovisioned to provide fairness of quality of service. That is, each user device in the LAN may receive data (e.g., information about where other users are in a multi-player game, state information for the other users (e.g., lives remaining, health remaining, etc.), and the like) at substantially similar times so that no user is advantaged or disadvantaged by having or not having data about other users in the multi-player gaming environment.

To allow for a wider field of players, remote participation, and reductions in the cost of producing tournaments, competitive multi-player gaming may be implemented using devices connected to one or more central servers via a WAN. However, in WANs, various types of user devices may be used to participate in the multi-player game, and these devices may have dissimilar network connections or operating conditions that may result in unfairness. Further, while some services allow for the broadcast of gaming or other multimedia events in real time, these services may not include features that enforce fairness or legitimacy of competitions (e.g., multi-player game competitions) in which users participate via a WAN.

Fairness may be defined in terms of quality of service (QoS). Various QoS parameters can be tuned to provide for fairness among devices participating in a multi-user gaming system. One QoS parameter may be a packet loss rate. Systems may generally achieve a loss rate low enough to maintain fairness across users (e.g., such that no single user in the multi-user gaming system do not receive a significantly smaller amount of game data than other users in the multi-user gaming system). Another QoS parameter may be a data rate. Generally, a data rate may need to be high enough to communicate critical or a minimum set of information (e.g., game state) in a timely manner. In some aspects, if video or other multimedia content is rendered by a central server rather than on user devices participating in the gaming system, guaranteed flow bit rate (GFBR) settings can be used to guarantee a minimum bit rate for each user in the multi-user gaming system. In some aspects, data rate QoS may also support marginal rate adaptation above a minimum rate. Still another QoS parameter may be latency, in which time-critical information is delivered to and from geographically distributed users in a fair manner.

Figure 4:
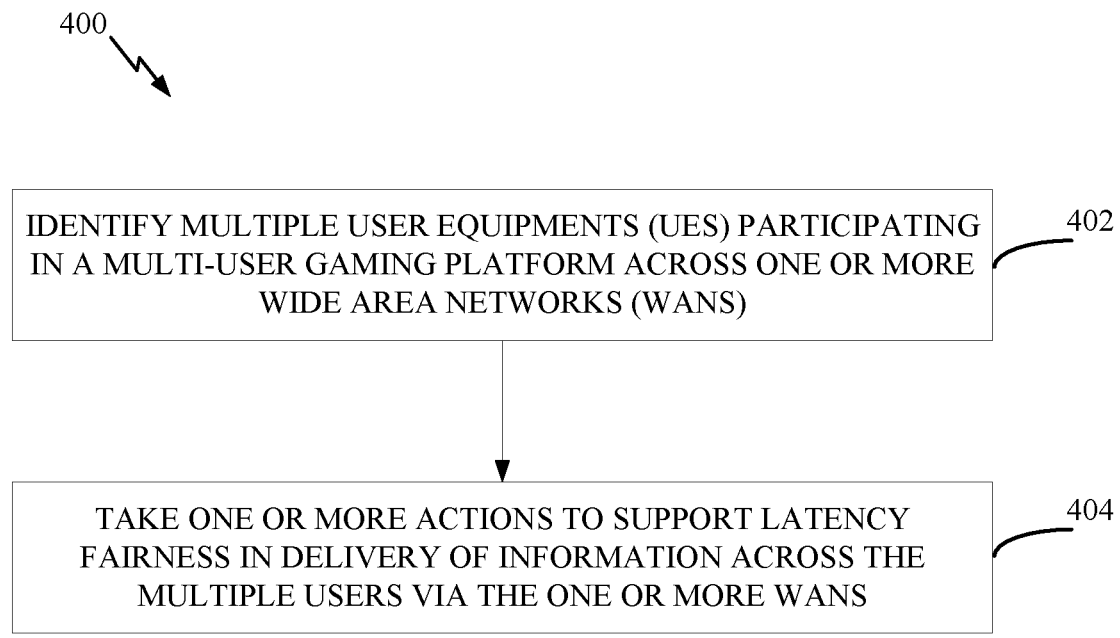
FIG. 4 illustrates example operations that may be performed by a network entity to enforce network latency fairness in a multi-user gaming platform, according to certain aspects described herein.

FIG. 4 illustrates example operations 400 that may be performed by a network entity to enforce network latency fairness in a multi-user gaming platform, according to certain aspects described herein. As discussed in further detail below, operations 400 may be performed, for example, by a central game server, a base station (e.g., a gNodeB), or a user plane function (UPF) in a core network entity.

As illustrated, operations 400 may begin at block 402, where the network entity identifies multiple user equipments (UEs) participating in a multi-user gaming platform across one or more wide area networks (WANs).

At block 404, the network entity takes one or more actions to support latency fairness in delivery of information across the multiple users via the one or more WANs. As discussed in further detail below, the one or more actions to support latency fairness in delivery of information across the multiple users may include the application of various timing adjustments to ensure that packets are processed according to the transmission timestamps associated with these packets. Thus, UEs participating in the multi-user gaming platform having a more robust connection (e.g., a connection having lower latency between transmission and delivery of packets to a game server, a connection requiring fewer retransmission attempts due to failed delivery of packets, etc.) may not be unfairly advantaged over UEs with less robust connections in the multi-user gaming platform. Meanwhile, users of UEs in the multi-user gaming platform having less robust connections may not be disadvantaged due to delays in receiving and processing data in packets transmitted by these UEs to a game server or other network entity (e.g., by reducing the likelihood that the packets provided by these UEs are processed after packets with similar timestamps transmitted to a game server or other network entity are received from UEs with more robust connections). More generally, the techniques discussed herein may improve the likelihood that packets are processed fairly so that actions are not taken within the multi-user gaming platform based on outdated or otherwise temporally inaccurate data.

Figure 5:
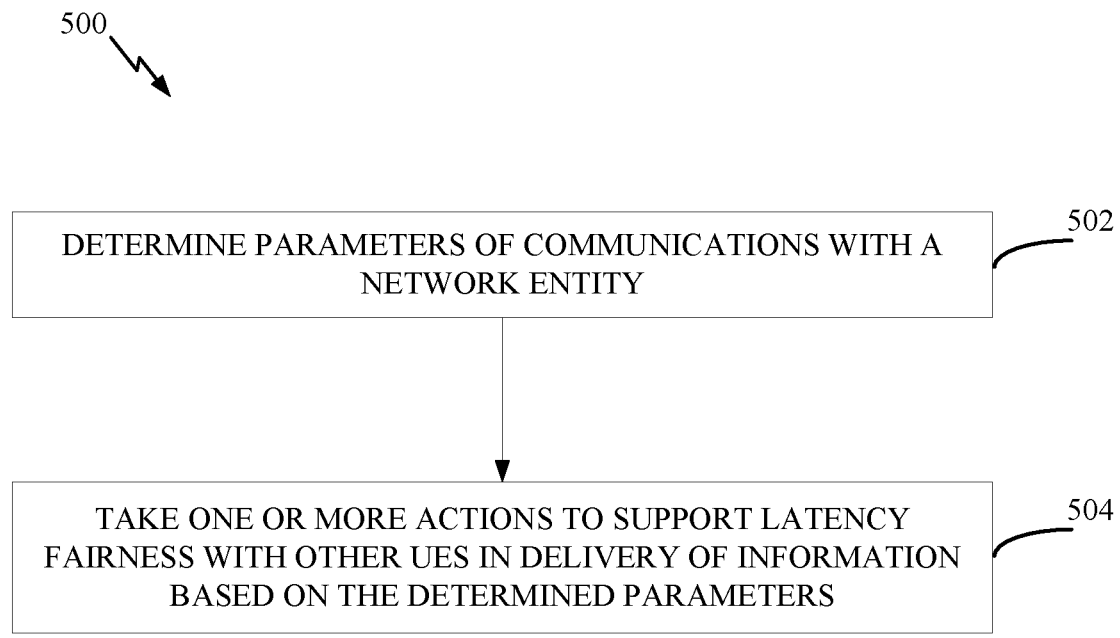
FIG. 5 illustrates example operations that may be performed by a user equipment (UE) to enforce network latency fairness in a multi-user gaming platform, according to certain aspects described herein.

FIG. 5 illustrates example operations 500 that may be performed by a user equipment (UE) to enforce network latency fairness in a multi-user gaming platform, according to certain aspects described herein.

As illustrated, operations 500 may begin at block 502, where the UE determines parameters of communications with a network entity. As discussed in further detail herein, the parameters of communications with the network entity may include various timing metrics or other data indicative of or otherwise associated with network latency, timing delay, or other metrics that can be used to adjust when data packets are processed in a multi-user gaming environment or other time-sensitive environment in which some degree of network fairness is to be implemented.

At block 504, the UE takes one or more actions to support latency fairness with other UEs in delivery of information based on the determined parameters. These actions, as discussed in further detail below, may include various adjustments to compensate for end-to-end transmission and/or processing delays between different UEs. These adjustments generally may be set such that packets associated with a given timestamp from multiple UEs are processed at the same time (or substantially the same time) regardless of the latency of a network through which any given UE from the multiple UEs is connected to a network entity (e.g., game server) in the multi-user gaming environment.

In some aspects, control of traffic between a game server and user devices (e.g., clients) interacting with the game server may be performed without network assistance or with limited network assistance.

Figure 6:
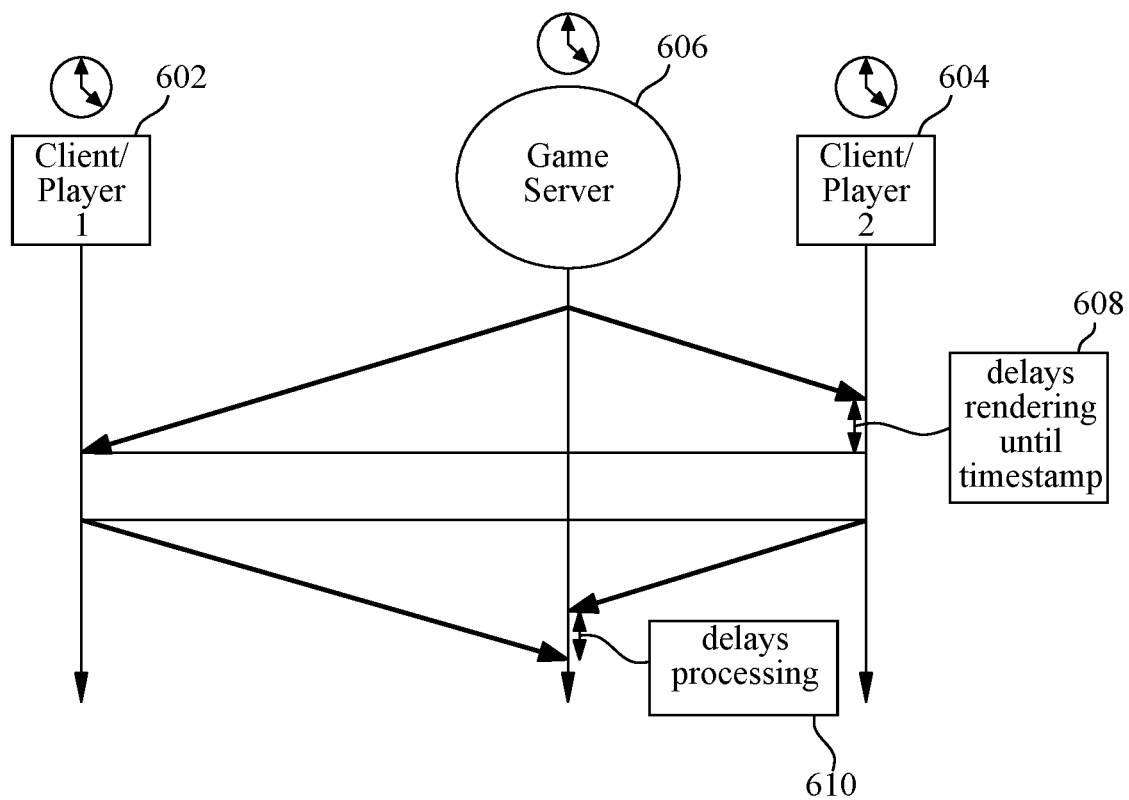
FIG. 6 illustrates an example of enforcing network latency fairness in an environment in which clients and network entities are externally synchronized, according to certain aspects described herein.

FIG. 6 illustrates an example of enforcing network latency fairness in an environment in which clients (e.g., UEs) and network entities are externally synchronized, in accordance with certain aspects of the present disclosure. The clients and network entities may be synchronized, for example, based on an external clock, such as a clock associated with a cellular telecommunications system (e.g., a clock maintained by a core network entity or a base station) or a clock associated with a satellite positioning system (e.g., NAVSTAR GPS, GLONASS, GALILEO, etc.).

To enforce network latency fairness for downlink communications, a client device can periodically measure end-to-end downlink latency. End-to-end downlink latency may be, for example, the difference between a timestamp included in a downlink packet identifying when the downlink packet was transmitted by the game server and a time at which the downlink packet was received by the client device (UE). The measured end-to-end downlink latency may be reported back to the game server, and the game server can adjust a downlink media playout timestamp based on the maximum end-to-end downlink latency reported by the clients connected with the game server. Subsequently, the game server can transmit downlink packets to the client devices connected with the game server with a timestamp indicating when the content included in the downlink packets is to be played out on each of the client devices. Generally, the timestamp may be set such that client devices that receive the downlink packet before the identified play out time delays rendering the content included in the downlink packets until the play out time.

To enforce network latency fairness for uplink communications, each client device may timestamp uplink packets with a timestamp identifying a time at which the uplink packets were transmitted to the game server. The game server can estimate a maximum uplink delay across all client devices based the timestamp included in uplink packets and a time at which the game server receives the uplink packets. Based on the maximum uplink delay, the game server can wait to process uplink packets before processing the data in the uplink packets, and the uplink packets may be ordered based on the transmission timestamps included in each uplink packet.

As illustrated in FIG. 6, client device 1 602 may be located a greater distance away from the game server 606 than client device 2 604, and thus, may have a larger latency for downlink and uplink packets. Client device 1 602 may receive downlink packets from the game server 606 later than client device 2 604, and the game server 606 may receive uplink packets transmitted from client device 1 602 later than uplink packets transmitted from client device 2 604 at the same time.

Based on the playout times, client device 1 602 may play out a downlink packet on receipt, and client device 2 604 may delay playing out the downlink packet according to a delay 608, which may be based on a time difference between arrival of a packet at client device 1 602 and the packet at client device 2 604 (and communicated to client device 2 604 from game server 606 or some other network entity). By delaying play out of the downlink packet at client device 2 604, a user of client device 2 604 may not be unfairly advantaged over a user of client device 1 602 by, for example, being able to view and react to data in the multi-user gaming environment before the user of client device 1 602 can view and react to the same data. Similarly, the game server 606 can delay processing an uplink packet from client device 2 604 based on a measured uplink latency 610, and the game server 606 can process an uplink packet from client device 1 602 upon receipt. As with delaying processing of received packets at a client device, delaying processing of uplink packets from a client device at game server 606 may prevent a user of client device 2 604 from being unfairly advantaged over a user of client device 1 602 by, for example, triggering various events in the multi-user gaming environment before similar events can be triggered by receipt and processing of packets from client device 1 602.

Generally, low latency may be orthogonal to fairness. Existing network procedures may set a packet delay budget (PDB) that is needed to support game play. However, for client-server time synchronization, internet protocol (IP) layer protocols may not be able to guarantee accuracy, as uplink and downlink delays may be asymmetrical and may vary over time. Further, various techniques for clock synchronization may exist. UEs may be able to use information in system information blocks (SIBs) to synchronize with a base station; however, new features may be needed to synchronize a game server with the base station, as the game server may not be connected to the base station via a radio interface. Using external sources, such as a clock associated with a satellite positioning system, may allow for high accuracy; however, support may not be consistent as devices located indoors or in poor coverage may not be able to lock onto a satellite positioning system signal and thus may not be able to synchronize a device clock with a satellite positioning system clock.

Figure 7A:
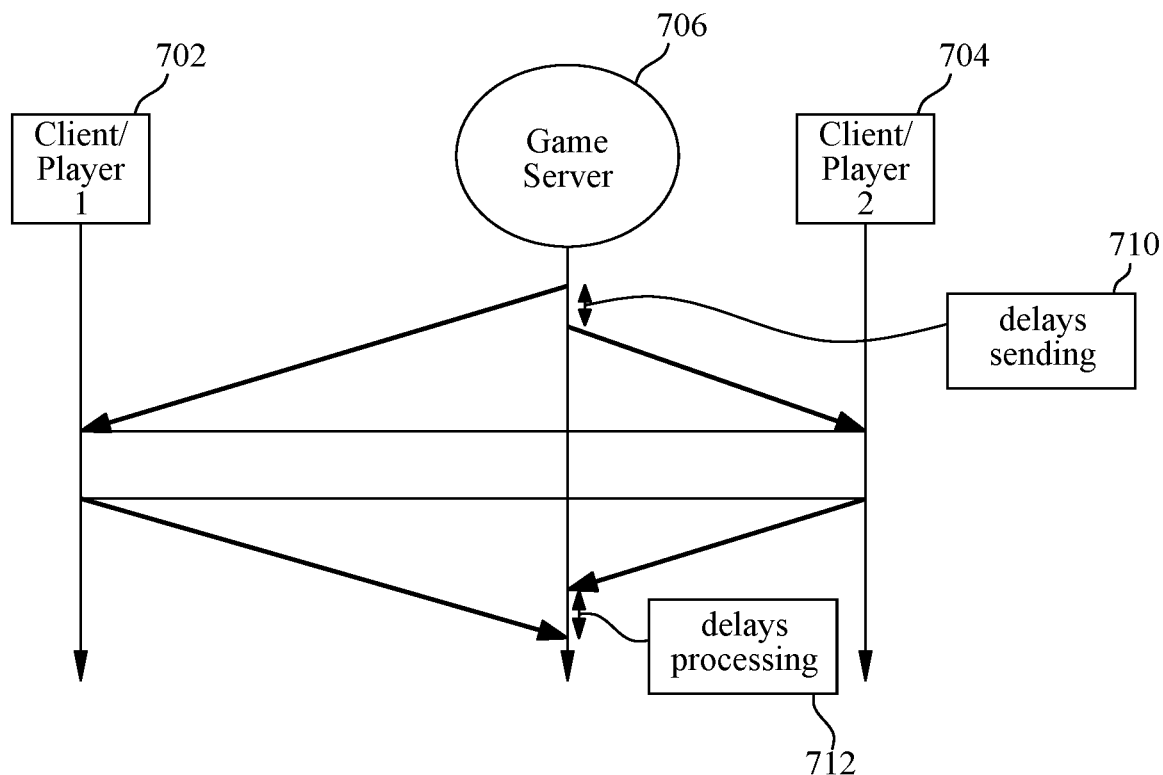
FIG. 7A and FIG. 7B illustrate examples of enforcing network latency fairness in an environment in which clients and network entities are unsynchronized, according to certain aspects described herein.
Figure 7B:
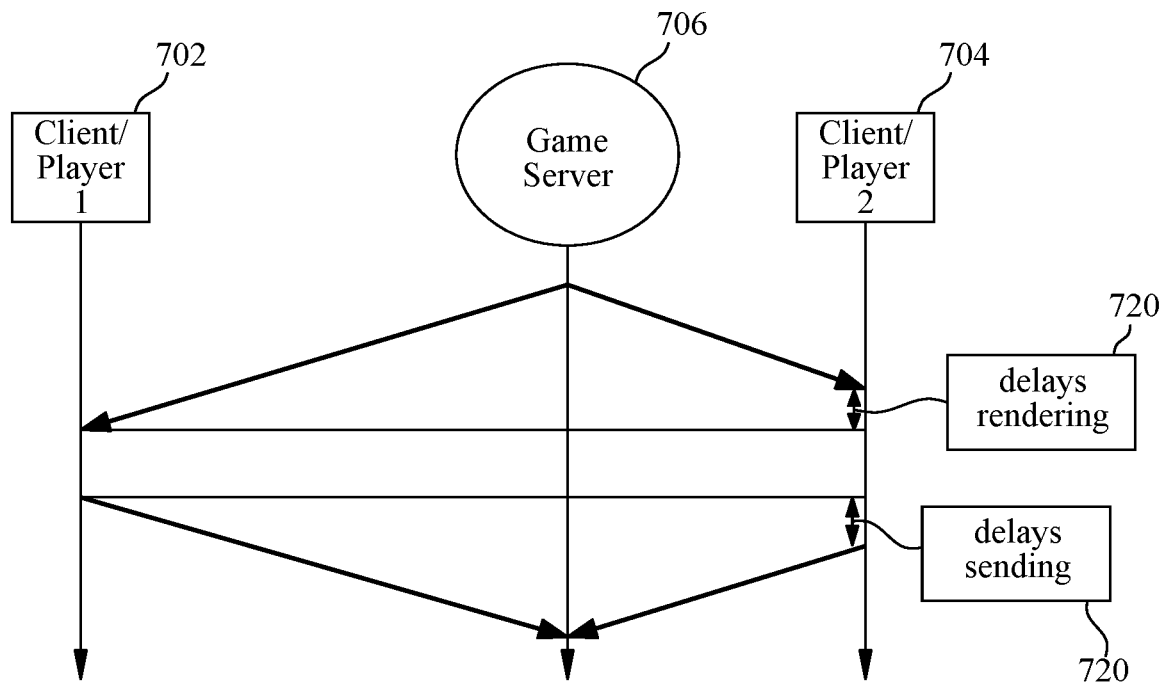

FIGS. 7A and 7B illustrate examples of enforcing network latency fairness in environments in which clients and network entities are unsynchronized, according to aspects described herein. In the examples illustrated in FIGS. 7A and 7B, the game server 706 and/or client devices 702 and 704 may periodically measure round-trip time (RTT) for communications between each other. An end-to-end delay may be estimated based on an assumption that uplink and downlink delays are symmetric (e.g., that both uplink and downlink delays are ½ *RTT). Such an assumption may be warranted, for example, based on assumptions that transmissions on an uplink channel will experience similar radio characteristics to transmissions on a downlink channel, as one channel may be considered the converse of the other channel and transmissions may be performed according to similar radio propagation and interference characteristics.

FIG. 7A illustrates an example in which a game server 706 enforces network latency fairness in an environment in which clients devices 702 and 704 and network entities are unsynchronized. In this example, the game server 706 may impose a handicap on client devices that have an estimated end-to-end delay that is less than a maximum end-to-end delay. The handicap may be implemented as a transmission delay 710 for communications from game server 706 to a client device (e.g., client device 704 illustrated in FIG. 7A) and as a processing delay for communications from a client device to the game server 706. Transmission of downlink packets may be delayed until a time such that recipients of such downlink packets may receive and process these packets at substantially the same time. Processing of uplink packets may be delayed at the game server until such a time that uplink packets transmitted by different client devices at the same transmission time are processed at the game server at the same time.

FIG. 7B illustrates an example in which a client device (e.g., client devices 702 and 704 illustrated in FIG. 7B) enforces network latency fairness in an environment in which client devices and network entities (e.g., a game server 706) are unsynchronized. In this example, a handicap may be communicated from the game server 706 to each client device 702, 704 served by the game server 706. The client devices 702, 704 may delay processing of received downlink packets and may delay transmission of uplink packets to the game server based on the handicap 720 communicated to the client devices 702, 704 by the game server 706. In this example, the handicap 720 may be symmetric and applicable to both uplink and downlink transmissions from a client device.

In some cases, end-to-end delay estimates may be inaccurate. For example, errors caused by uplink/downlink asymmetry and variances in delay caused by the radio conditions, a scheduler, and/or network congestion may result in an inaccurate measurement of end-to-end delay. In one example, an asymmetrical uplink/downlink delay where the downlink delay is less than the uplink delay may result in a user seeing a situation sooner but being delayed in performing actions within the gaming environment. Thus, to compensate for these inaccuracies, various techniques may be used to assist a game server in enforcing latency fairness in a multi-user gaming environment.

In some aspects, the network may assist in enforcing latency fairness in a multi-user gaming environment. A game server may be connected with a WAN via an IP network connection to a user plane function (UPF) or other core radio access network (RAN) entity. Latency between the game server and a client device (UE) may be a combination of IP network delays between the game server and UPF, N3 delays between the UPF and a base station, and RAN delays between the base station and the client device.

In some aspects, a similar delay may be applied to communications between the central game server and the one or more UPFs. Such a case may exist, for example, when a central game server is located near UPFs in a network or at a location in which delays between the central game server and each UPF is substantially similar.

Figure 8:
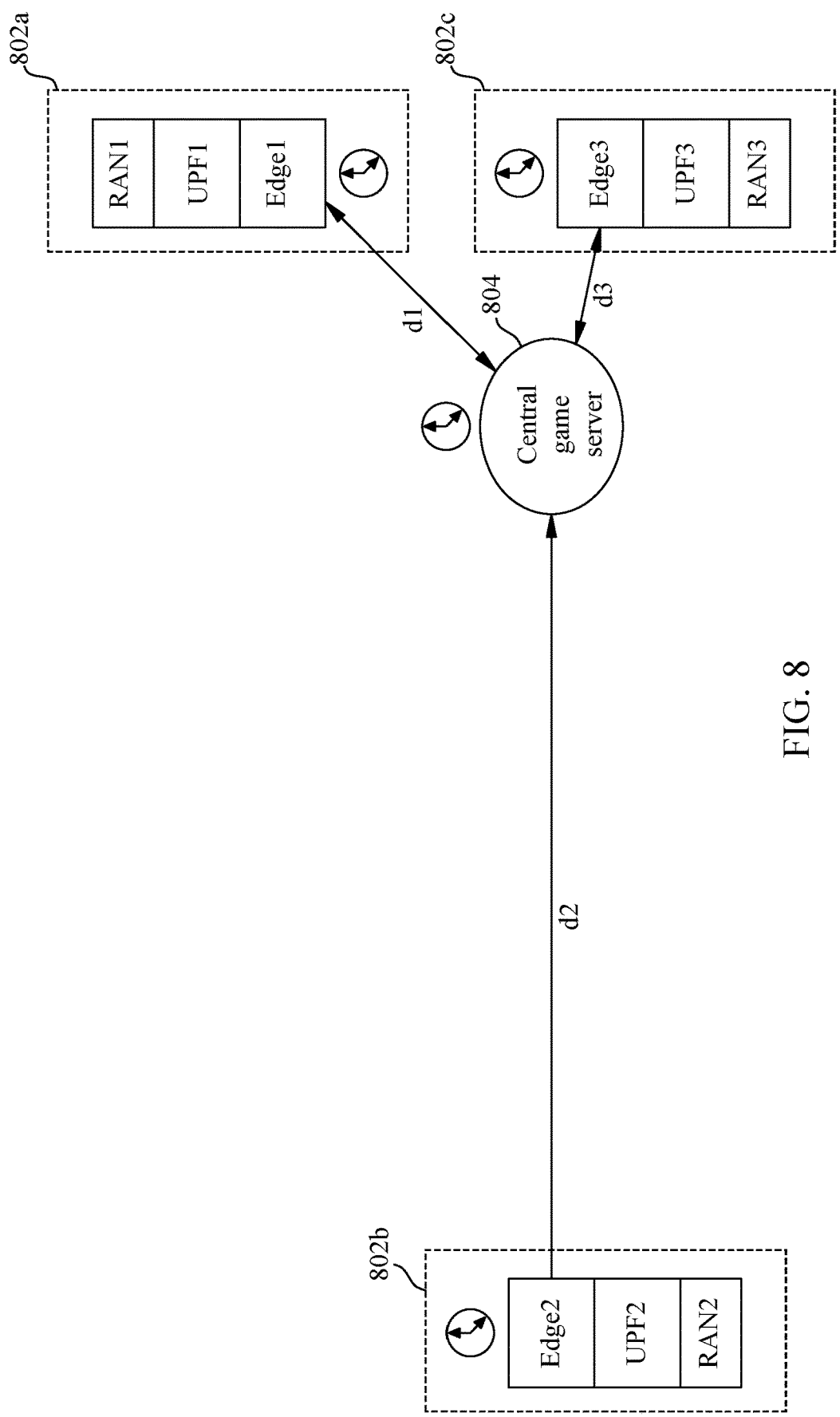
FIG. 8 illustrates an example of enforcing network latency fairness using edge servers synchronized with a central server, according to certain aspects described herein.

FIG. 8 illustrates an example in which network latency fairness is enforced using edge servers or UPFs synchronized with a central server, according to certain aspects described herein. In this example, different amounts of delay may exist between the central game server 804, UPF1 802a, UPF2 802b, and UPF3 802c. For example, UPF2 802b, which may be located at a largest distance from the central game server 804, may have the largest delay d2. Meanwhile, UPF3 802c, located at a shortest distance from the central game server 804, may have the shortest delay d3. The edge servers (which may be collocated with respective UPFs) or UPFs 802 may be synchronized with the central game server 804 via one or more timing protocols (e.g., network time protocol, synchronization with a satellite positioning system clock, etc.). The techniques discussed above with respect to FIGS. 6, 7A, and/or 7B may be used to measure delay between an edge server or UPF 802 and the central game server 804 to compensate for IP network delays between the game server and a radio access network.

In some aspects, a radio access network (RAN) packet delay budget may be used to compensate for server-to-UPF delays. A game server may set a packet delay budget for each UPF to account for IP network delays. For example, the central server may measure delays to each UPF based on a round trip time (e.g., ½ *RTT) to each UPF or based on clock synchronization with the UPFs to make measurements. The game server may then compensate for delay variations between the UPFs by setting PDB limits for each UE under a UPF such that UPFs with a shortest delay have a largest delay budget and UPFs with longer delays have smaller delay budgets.

In some aspects, a RAN may be used to manage delays and enforce latency among UEs or other client devices participating in a multi-user gaming environment.

Figure 9:
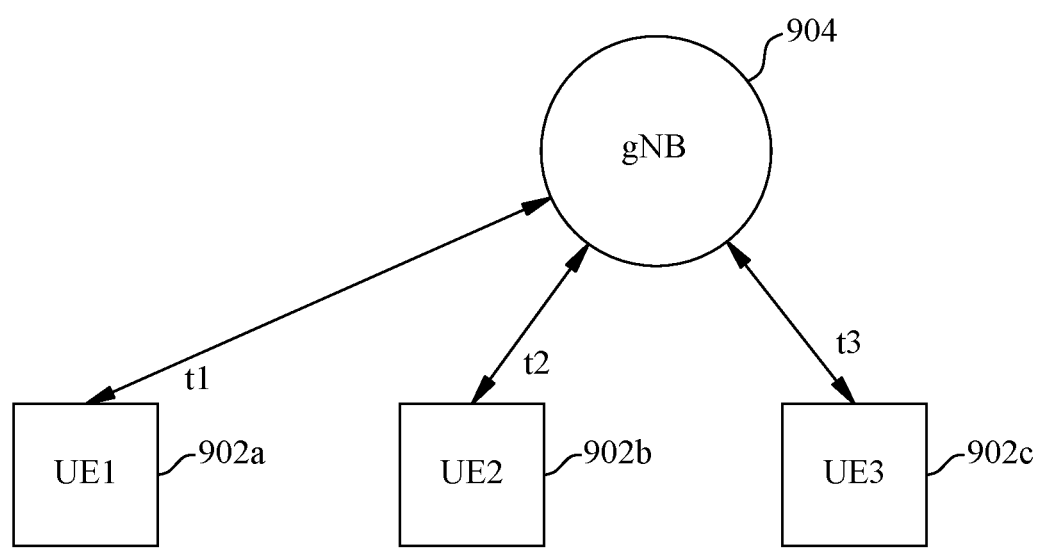
FIG. 9 illustrates an example of enforcing network latency fairness using a radio access network (RAN) scheduler to compensate for RAN delays, according to certain aspects described herein.

FIG. 9 illustrates an example in which a RAN scheduler may be used to enforce network latency fairness, according to certain aspects described herein. In this example, grant times t1 for UE1 702a, t2 for UE2 902b, and t3 for UE3 902c may be configured such that downlink packets arrive at the UEs 902 at the same time and uplink packets are ready for transmission from the UEs 902 at the same time. A RAN scheduler at gNodeB 904 may, for example, set a RAN packet delay budget (PDB) to reduce variance among UEs connected with the base station. The PDB may be, for example, set based on a maximum packet delay with a set confidence level, which may reduce variance in when packets are received or transmitted by the UEs at some expense in respect of network capacity. The RAN scheduler at gNodeB 904 may deliver traffic based on a specified packet delay target, and no sooner than the packet delay target. A QoS identifier (5QI) may be defined with a scheduler algorithm that may impact capacity. In some aspects, the QoS requirements defined by a RAN scheduler may impact an ability to meet the packet delay target with retransmissions. Enforcing network latency fairness may also increase in complexity as the number of users or a data rate increases, as increases in the number of users or a data rate in a network may reduce a packet delay budget or an ability to enforce network latency fairness while balancing performance considerations at various client devices in a multi-user gaming platform.

Figure 10:
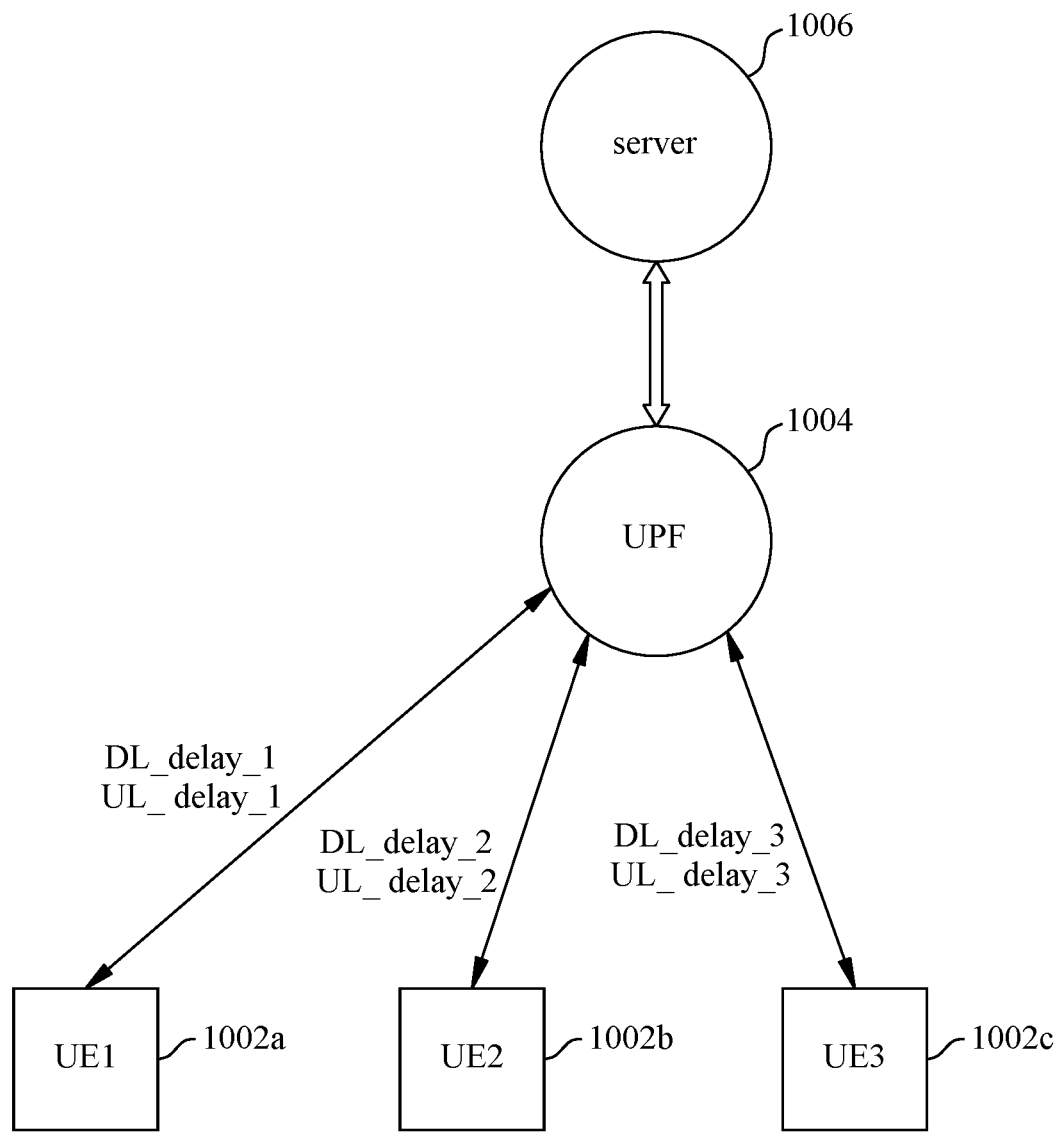
FIG. 10 illustrates an example of enforcing network latency fairness based on uplink and downlink handicaps between a user equipment (UE) and a network entity, according to certain aspects described herein.

FIG. 10 illustrates an example of enforcing network latency fairness in which a user plane function (UPF) 1004 may be used to improve fairness across UEs 1002 in a multi-user gaming environment. The UPF 1004 may use, for example, QoS assist procedures (e.g., QoS procedures defined for ultra-reliable low latency communications (URLLC) systems) to measure an average uplink and downlink delay between the UPF 1004 and each UE 1002. The UPF 1004 may handicap or otherwise delay forwarding downlink packets to UEs 1002 with shorter average downlink delays such that downlink packets are received by UE1 1002a, UE2 1002b, and UE3 1002c at the same time or substantially the same time. Similarly, the UPF 1004 may handicap or otherwise delay forwarding of uplink packets from UEs 1002 with shorter uplink delays to a game server 1006 such that uplink packets transmitted by the UEs 1002 at the same time are delivered to the game server at the same time or substantially the same time. In this example, fairness may be limited by how closely the average uplink/downlink delay estimates match actual packet transport delays.

In some aspects, the UPF 1004 illustrated in FIG. 10 may not compensate for variations in uplink and downlink latencies. In such a case, the game server 1006 may compensate for uplink and downlink delays based on UPF reports. The UPF 1004 may, for example, use QoS assist procedures to measure average uplink and downlink delays and transmit a report to the game server 1006 with uplink and downlink delay measurements for each UE 1002. in some aspects, where there is more than one UPF with variance in server-to-UPF delays, the server 1006 and UPF 1004 may measure these delays based, for example, on a measured round trip time or clock synchronization between the UPF 1004 and game server 1006 via a precision time protocol (PTP). Delays may be measured, and the game server 1006 may compensate for server-to-UPF and uplink/downlink delays in forwarding downlink packets or processing uplink packets.

Figure 11:
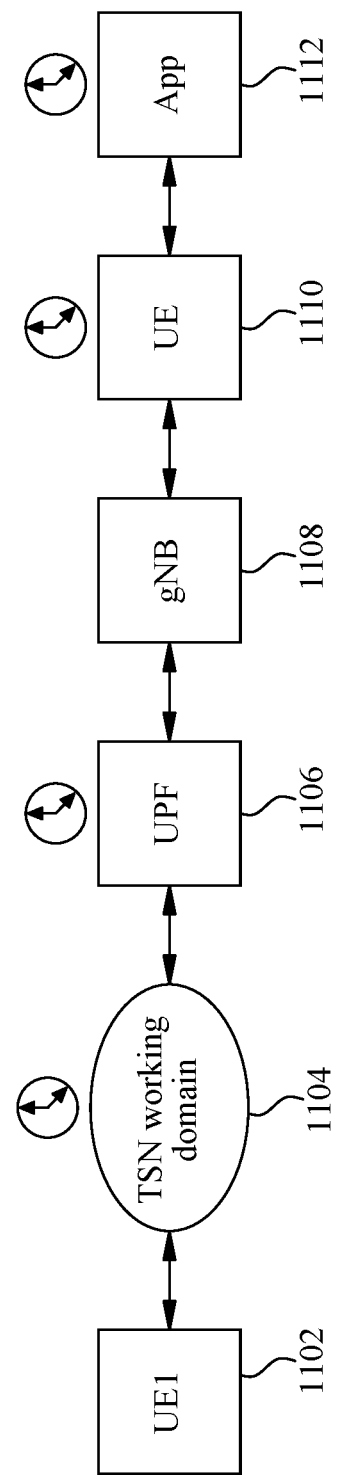
FIG. 11 illustrates an example time sensitive network architecture in which aspects of the present disclosure may be implemented.

FIG. 11 illustrates an example network architecture in which timestamping can be used to enforce network latency fairness. As illustrated, a game server 1102 may communicate with a corresponding application 1112 executing on a UE 1110 by transmitting downlink packets through a time sensitive network (TSN) working domain 1104 to a UPF 1106. The UPF 1106 generally forwards packets to a base station 1108, and the base station 1108 then forwards those packets to UE 1110 for delivery to the application 1112. Uplink communications may be transmitted from the application 1112 executing on the UE 1110 to a base station 1108, which may forward the packet to a UPF 1106. The UPF 1106 may then then forward the packet to a game server 1102 via the TSN working domain 1104. RAN clock information, which may be sourced from clocks at the UPF 1106 and UE 1110 synchronized via various precision time protocols (e.g., gPTP), may be used to compensate for delays within the RAN. Clock synchronization may be enabled between the TSN working domain 1104 and a UE 1110 and application 1112 executing thereon. Clock synchronization may also be used in the techniques described above.

For media packets, RAN timestamps may not be enabled to compensate for RAN delays. For example, the RAN timestamps may not be used to delay playout of downlink media packets or to delay processing of uplink media packets. Gate schedules need not be designed for media packets to guarantee a delivery time.

For UEs and UPFs synchronized to a common clock (e.g., a RAN clock), uplink and downlink packets may be timestamped. The UPF may timestamp downlink media packets with playout times based on an expected playout time and a maximum downlink delay identified across the UEs participating in the multi-user gaming environment. Using the common clock, the UE may delay delivery of a downlink packet to the application executing on the UE for just-in-time delivery and playout in the application based on the timestamp in the downlink media packets. For uplink packets, the UE may timestamp packets based on the common clock with a transmission time from the UE. The UPF may use a maximum uplink delay across the UEs participating in the multi-user gaming environment to determine when to forward packets to the game server, and uplink packets may be ordered based on the timestamps included in these packets.

Various techniques may be used to determine a maximum uplink or downlink delay to all UEs participating in the multi-user gaming environment. For example, a UPF can use a guaranteed bit rate and determine a maximum packet delay budget (PDB) for all UEs admitted to the multi-user gaming environment. In some aspects, a policy may be defined to admit UEs with a same PDB value. In another example, QoS Assisted URLLC delay measurement procedures may be used to measure average uplink/downlink delays for each UE, as discussed above. In some aspects, a margin may be added to the maximum average uplink/downlink delay to compensate for variances above the average delay. In still another example, synchronized clocks at the UE and UPF may be used to directly measure a maximum delay. The uplink delay may be measured directly by the UPF for each uplink packet as the difference between the packet arrival time at the UPF and a packet timestamp included in the uplink packet. The downlink delay may be measured by transmitting packets with a non-playout-time timestamp (e.g., a transmission time from the UPF), and the UE may measure a downlink delay based on a difference between the time at which the UE received the downlink packet and the non-playout-time timestamp. The measured downlink delay may be reported back to the UPF.

Figure 12:
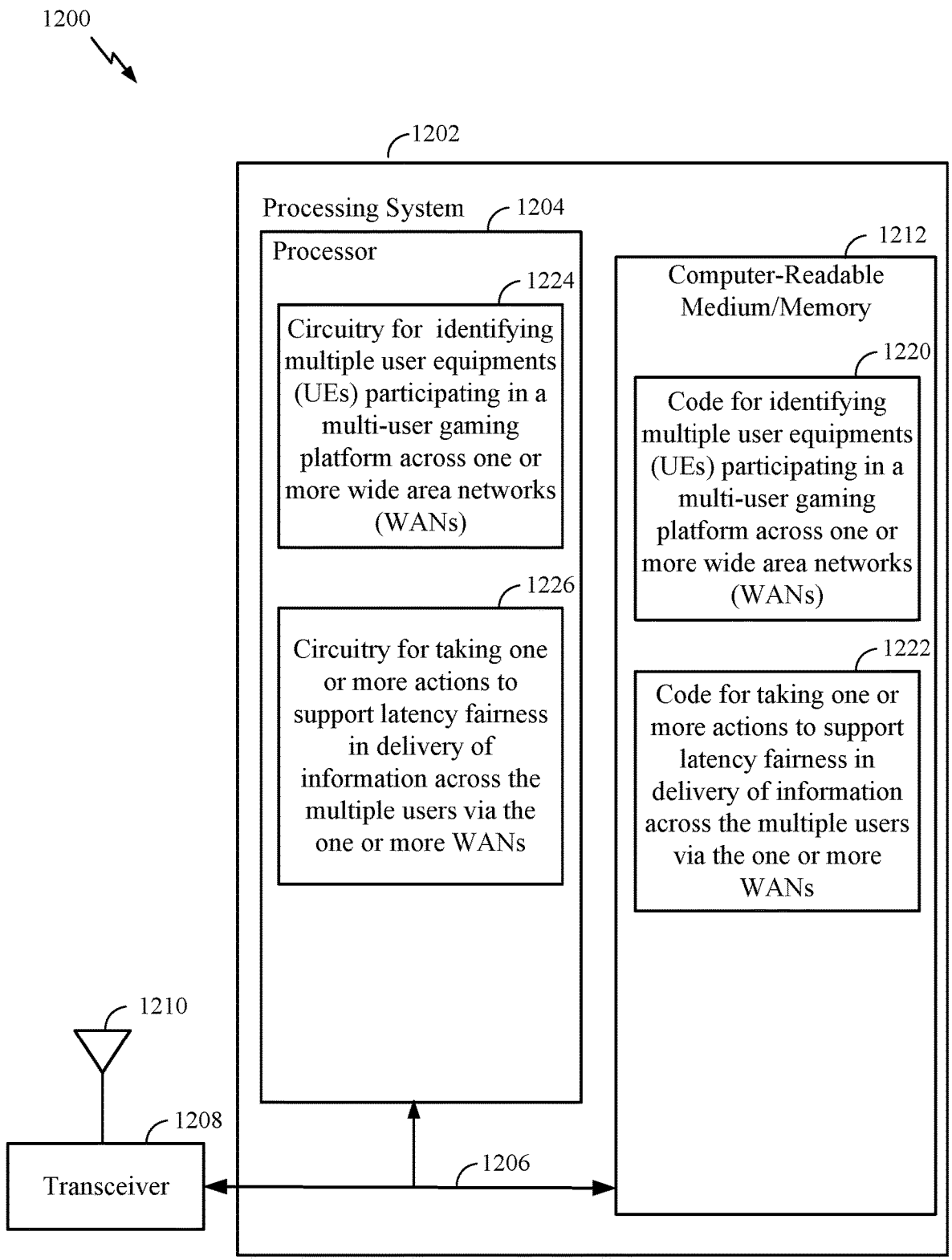
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 4. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 4, or other operations for enforcing network latency fairness in multi-user gaming platforms. In certain aspects, computer-readable medium/memory 1212 stores code 1220 for identifying multiple user equipments (UEs) participating in a multi-user gaming platform across one or more wide area networks (WANs); and code 1222 for taking one or more actions to support latency fairness in delivery of information across the multiple users via the one or more WANs. In certain aspects, the processor 1204 has circuitry configured to implement the code stored in the computer-readable medium/memory 1212. The processor 1204 includes circuitry 1230 for identifying multiple user equipments (UEs) participating in a multi-user gaming platform across one or more wide area networks (WANs); and circuitry 1232 for taking one or more actions to support latency fairness in delivery of information across the multiple users via the one or more WANs.

Figure 13:
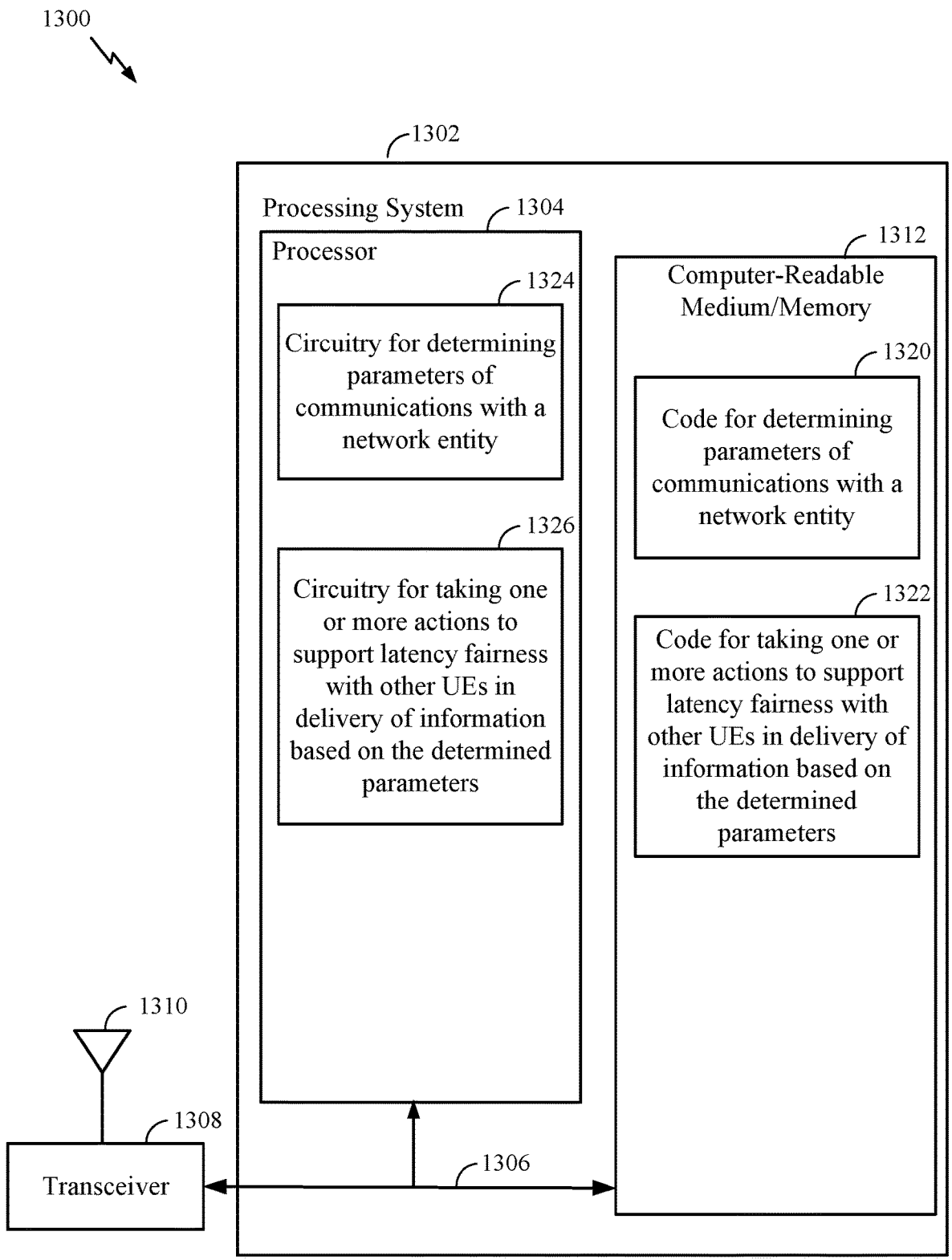
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 5. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 5, or other operations for enforcing network latency fairness in multi-user gaming platforms. In certain aspects, computer-readable medium/memory 1312 stores code 1320 for determining parameters of communications with a network entity; and code 1322 for taking one or more actions to support latency fairness with other UEs in delivery of information based on the determined parameters. In certain aspects, the processor 1304 has circuitry configured to implement the code stored in the computer-readable medium/memory 1312. The processor 1304 includes circuitry 1330 for determining parameters of communications with a network entity; and circuitry 1332 for taking one or more actions to support latency fairness with other UEs in delivery of information based on the determined parameters.

Example Clauses

Clause 1: A method for communications by a network entity, comprising: identifying multiple user equipments (UEs) participating in a multi-user gaming platform across one or more wide area networks (WANs); and taking one or more actions to support latency fairness in delivery of information across the multiple users via the one or more WANs.

Clause 2: The method of Clause 1, wherein the network entity comprises a game server.

Clause 3: The method of Clause 2, wherein the one or more actions comprise: receiving reports, from the multiple UEs, indicating downlink latency between the game server and the multiple UEs; and adjusting, based on the reports, a downlink media playout timestamp used by the multiple UEs to determine when to playout downlink media.

Clause 4: The method of Clause 2, wherein the one or more actions comprise: determining a handicap for one or more of the multiple UEs, based on estimated link delays between the game server and the multiple UEs.

Clause 5: The method of Clause 4, wherein the one or more actions further comprise at least one of: delaying downlink packet transmission based on the handicap; or delaying uplink packet processing based on the handicap.

Clause 6: The method of any one of Clauses 4 or 5, wherein the one or more actions further comprise: communicating the handicap to at least one of the UEs.

Clause 7: The method of any one of Clauses 1 through 6, wherein the one or more actions comprise: synchronizing with one or more edge servers or user plane functions (UPFs) to compensate for delay variations in the one or more WANs.

Clause 8: The method of any one of Clauses 1 through 7, wherein the one or more actions comprise: receiving reports, from one or more user plane functions (UPFs), indicating at least one of uplink delay or downlink delay between UEs and the UPFs; and compensating for delay variations in the one or more WANs based on the reports.

Clause 9: The method of any one of Clauses 1 through 8, wherein the one or more actions comprise: estimating delays between the network entity and one or more user plane functions (UPFs); and compensating for delay variations to the one or more WANs by setting packet delay budget (PDB) limits for the UE based on the estimated delays.

Clause 10: The method of any one of Clauses 1 through 9, wherein the network entity comprises a base station and the one or more actions comprise at least one of: setting a packet delay budget (PDB) limit to reduce variations among the UEs; or scheduling traffic delivery at a specified packet delay target.

Clause 11: The method of any one of Clauses 1 through 9, wherein the network entity comprises a user plane function (UPF).

Clause 12: The method of Clause 11, wherein the one or more actions comprise: measuring average downlink delays between the UPF and one or more of the UEs; and at least one of handicapping or delaying forwarding of downlink packets from a server to UEs based on the measurement.

Clause 13: The method of any one of Clauses 11 or 12, wherein the one or more actions comprise: measuring average uplink delays between one or more of the UEs and the UPF; and at least one of handicapping or delaying forwarding uplink packets to a server based on the measurement.

Clause 14: The method of any one of Clauses 11 through 13, wherein the UPF and the UEs are synchronized to a common clock and the one or more actions comprise at least one of: including a timestamp, based on the common clock and a maximum downlink delay for all UEs, in downlink media packets with playout times; or using a maximum uplink delay for all UEs, measured based on the common clock, to determine a waiting time for forwarding uplink packets.

Clause 15: The method of Clause 14, wherein: the maximum uplink delay for all UEs comprises a maximum average uplink delay for all UEs plus an uplink variance margin, and the maximum downlink delay for all UEs comprises a maximum average downlink delay for all UEs plus a downlink variance margin.

Clause 16: The method of Clause 14, wherein: the maximum uplink delay for all UEs is determined based on a difference between a packet arrival time at the UPF and a packet time stamp included in uplink packets from the UEs, and the maximum downlink delay for all UEs is determined based on reports from the UEs of a difference between a packet arrival time at the UEs and a packet time stamp included in downlink packets transmitted to the UEs.

Clause 17: A method for communications by a user equipment (UE) participating in a multi-user gaming platform, comprising: determining parameters of communications with a network entity; and taking one or more actions to support latency fairness with other UEs in delivery of information based on the determined parameters.

Clause 18: The method of Clause 17, wherein the network entity comprises a game server.

Clause 19: The method of Clause 18, wherein the one or more actions comprise: transmitting, to the game server, reports indicating downlink latency between the game server and the UE.

Clause 20: The method of any one of Clauses 18 or 19, wherein the one or more actions comprise: transmitting uplink data with time stamps to the game server for use in estimating uplink delays between the UE and game server and/or delaying processing of player input at the game server.

Clause 21: The method of any one of Clauses 18 through 20, wherein the parameters of communications with the network entity comprise a maximum uplink delay for UEs participating in the multi-user gaming platform, and the one or more actions comprises delaying transmission of uplink data to the game server based on the maximum uplink delay.

Clause 22: The method of any one of Clauses 18 through 20, wherein the parameters of communications with the network entity comprise a handicap for the UE received from the network entity, and the one or more actions comprises at least one of: delaying uplink packet transmission to the game server based on the handicap; or delaying delivery of downlink packets to an application executing on the UE based on the handicap.

Clause 23: The method of any one of Clauses 17 through 22, wherein the network entity comprises a base station and the one or more actions comprise: communicating with the network entity based on a packet delay budget (PDB) limit set to reduce variations among UEs participating in the multi-user gaming platform; or communicating with the network entity based on a specified packet delay target.

Clause 24: The method of any one of Clauses 17 through 22, wherein the network entity comprises a user plane function (UPF).

Clause 25: The method of Clause 24, wherein the UE and the UPF are synchronized to a common clock and the one or more actions comprise at least one of: playing out received downlink media packets based on a playout timestamp based on the common clock and a maximum downlink delay for all UEs participating in the multi-user gaming platform; or including a timestamp, based on the common clock, in uplink packets for use by the UPF in determining uplink packet delays and/or forwarding the uplink packets to a game server.

Clause 26: The method of Clause 25, wherein the one or more actions further comprise at least one of: communicating with the network entity based on a packet delay budget (PDB) for the UE and a maximum PDB across all UEs participating in the multi-user gaming platform; or communicating with the network entity based on a same PDB value for all UEs participating in the multi-user gaming platform.

Clause 27: The method of any one of Clauses 25 or 26, wherein the maximum uplink delay for all UEs participating in the multi-user gaming platform comprises a maximum average uplink delay for all UEs plus an uplink variance margin, and the maximum downlink delay for all UEs participating in the multi-user gaming platform comprises a maximum average downlink delay for all UEs plus a downlink variance margin.

Clause 28: The method of any one of Clauses 25 or 26, wherein the maximum uplink delay for all UEs is determined based on a difference between a packet arrival time at the UPF and a packet time stamp included in uplink packets from the UEs, and the maximum downlink delay for all UEs is determined based on reports from the UEs of a difference between a packet arrival time at the UEs and a packet time stamp included in downlink packets transmitted to the UEs.

Clause 29: An apparatus, comprising: a memory having executable instructions stored thereon; and a processor configured to execute the executable instructions to cause the apparatus to perform the operations of any one of Clauses 1 through 28.

Clause 30: An apparatus, comprising: means for performing the operations of any one of Clauses 1 through 28.

Clause 31: A computer-readable medium having instructions stored thereon which, when executed by a processor, performs the operations of any one of Clauses 1 through 28.

ADDITIONAL CONSIDERATIONS

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for communications by a network entity, comprising:
    identifying multiple user equipments (UEs) participating in a multi-user gaming platform across one or more wide area networks (WANs); and
    taking one or more actions to support latency fairness in delivery of information across the multiple users via the one or more WANs;
    wherein the network entity comprises a user plane function (UPF);
    wherein the UPF and the UEs are synchronized to a common clock and the one or more actions comprise at least one of:
        including a timestamp, based on the common clock and a maximum downlink delay for all UEs, in downlink media packets with playout times; or
        using a maximum uplink delay for all UEs, measured based on the common clock, to determine a waiting time for forwarding uplink packets.

2. The method of claim 1, wherein the network entity comprises a game server.

3. The method of claim 2, wherein the one or more actions comprise:
    receiving reports, from the multiple UEs, indicating downlink latency between the game server and the multiple UEs; and
    adjusting, based on the reports, a downlink media playout timestamp used by the multiple UEs to determine when to playout downlink media.

4. The method of claim 2, wherein the one or more actions comprise:
    determining a handicap for one or more of the multiple UEs, based on estimated link delays between the game server and the multiple UEs.

5. The method of claim 4, wherein the one or more actions further comprise at least one of:
    delaying downlink packet transmission based on the handicap; or
    delaying uplink packet processing based on the handicap.

6. The method of claim 4, wherein the one or more actions further comprise:
    communicating the handicap to at least one of the UEs.

7. The method of claim 1, wherein the one or more actions comprise:
    synchronizing with one or more edge servers or user plane functions (UPFs) to compensate for delay variations in the one or more WANs.

8. The method of claim 1, wherein the one or more actions comprise:
    receiving reports, from one or more user plane functions (UPFs), indicating at least one of uplink delay or downlink delay between UEs and the UPFs; and
    compensating for delay variations in the one or more WANs based on the reports.

9. The method of claim 1, wherein the one or more actions comprise:
    estimating delays between the network entity and one or more user plane functions (UPFs); and
    compensating for delay variations to the one or more WANs by setting packet delay budget (PDB) limits for a UE based on the estimated delays.

10. The method of claim 1, wherein the network entity comprises a base station and the one or more actions comprise at least one of:
    setting a packet delay budget (PDB) limit to reduce variations among the UEs; or
    scheduling traffic delivery at a specified packet delay target.

11. The method of claim 1, wherein the one or more actions comprise:
    measuring average downlink delays between the UPF and one or more of the UEs; and
    at least one of handicapping or delaying forwarding of downlink packets from a server to UEs based on the measurement.

12. The method of claim 1, wherein the one or more actions comprise:
    measuring average uplink delays between one or more of the UEs and the UPF; and
    at least one of handicapping or delaying forwarding of uplink packets to a server based on the measurement.

13. The method of claim 1, wherein:
the maximum uplink delay for all UEs comprises a maximum average uplink delay for all UEs plus an uplink variance margin, and the maximum downlink delay for all UEs comprises a maximum average downlink delay for all UEs plus a downlink variance margin.

14. The method of claim 1, wherein:
the maximum uplink delay for all UEs is determined based on a difference between a packet arrival time at the UPF and a packet time stamp included in uplink packets from the UEs, and the maximum downlink delay for all UEs is determined based on reports from the UEs of a difference between a packet arrival time at the UEs and a packet time stamp included in downlink packets transmitted to the UEs.

15. A method for communications by a user equipment (UE) participating in a multi-user gaming platform, comprising:
determining parameters of communications with a network entity; and
taking one or more actions to support latency fairness with other UEs in delivery of information based on the determined parameters;
wherein the network entity comprises a user plane function (UPF);
wherein the UE and the UPF are synchronized to a common clock and the one or more actions comprise at least one of:
playing out received downlink media packets based on a playout timestamp based on the common clock and a maximum downlink delay for all UEs participating in the multi-user gaming platform; or
including a timestamp, based on the common clock, in uplink packets for use by the UPF in determining uplink packet delays and/or forwarding the uplink packets to a game server.

16. The method of claim 15, wherein the network entity comprises a game server.

17. The method of claim 16, wherein the one or more actions comprise:
transmitting, to the game server, reports indicating downlink latency between the game server and the UE.

18. The method of claim 16, wherein the one or more actions comprise:
transmitting uplink data with time stamps to the game server for use in estimating uplink delays between the UE and game server and/or delaying processing of player input at the game server.

19. The method of claim 16, wherein the parameters of communications with the network entity comprise a maximum uplink delay for UEs participating in the multi-user gaming platform, and the one or more actions comprises delaying transmission of uplink data to the game server based on the maximum uplink delay.

20. The method of claim 16, wherein the parameters of communications with the network entity comprise a handicap for the UE received from the network entity, and the one or more actions comprises at least one of:
delaying uplink packet transmission to the game server based on the handicap; or
delaying delivery of downlink packets to an application executing on the UE based on the handicap.

21. The method of claim 15, wherein the network entity comprises a base station and the one or more actions comprise:
communicating with the network entity based on a packet delay budget (PDB) limit set to reduce variations among UEs participating in the multi-user gaming platform; or
communicating with the network entity based on a specified packet delay target.

22. The method of claim 15, wherein the one or more actions further comprise at least one of:
communicating with the network entity based on a packet delay budget (PDB) for the UE and a maximum PDB across all UEs participating in the multi-user gaming platform; or
communicating with the network entity based on a same PDB value for all UEs participating in the multi-user gaming platform.

23. The method of claim 15, wherein a maximum uplink delay for all UEs participating in the multi-user gaming platform comprises a maximum average uplink delay for all UEs plus an uplink variance margin, and the maximum downlink delay for all UEs participating in the multi-user gaming platform comprises a maximum average downlink delay for all UEs plus a downlink variance margin.

24. The method of claim 15, wherein a maximum uplink delay for all UEs is determined based on a difference between a packet arrival time at the UPF and a packet time stamp included in uplink packets from the UEs, and the maximum downlink delay for all UEs is determined based on reports from the UEs of a difference between a packet arrival time at the UEs and a packet time stamp included in downlink packets transmitted to the UEs.

25. An apparatus for communications by a network entity, comprising:
a memory having executable instructions stored thereon; and
a processor configured to execute the executable instructions to cause the apparatus to:
identify multiple user equipments (UEs) participating in a multi-user gaming platform across one or more wide area networks (WANs), and
take one or more actions to support latency fairness in delivery of information across the multiple users via the one or more WANs;
wherein the network entity comprises a user plane function (UPF);
wherein the UPF and the UEs are synchronized to a common clock and the one or more actions comprise at least one of:
including a timestamp, based on the common clock and a maximum downlink delay for all UEs, in downlink media packets with playout times; or
using a maximum uplink delay for all UEs, measured based on the common clock, to determine a waiting time for forwarding uplink packets.

26. An apparatus, comprising:
a memory having executable instructions stored thereon; and
a processor configured to execute the executable instructions to cause the apparatus to:
determine parameters of communications with a network entity; and
take one or more actions to support latency fairness with other UEs in delivery of information based on the determined parameters;
wherein the network entity comprises a user plane function (UPF);

wherein the UE and the UPF are synchronized to a common clock and the one or more actions comprise at least one of:
  playing out received downlink media packets based on a playout timestamp based on the common clock and a maximum downlink delay for all UEs participating in the multi-user gaming platform; or
  including a timestamp, based on the common clock, in uplink packets for use by the UPF in determining uplink packet delays and/or forwarding the uplink packets to a game server.

* * * * *